Oct. 31, 1967    W. SCHUSTER    3,349,526
COLLAPSIBLE STRUCTURAL UNIT, REVERSIBLY RESILIENT IN
A PREDETERMINED DIRECTION AND RIGID IN
A SECOND PREDETERMINED DIRECTION
Filed May 20, 1965                              5 Sheets-Sheet 1
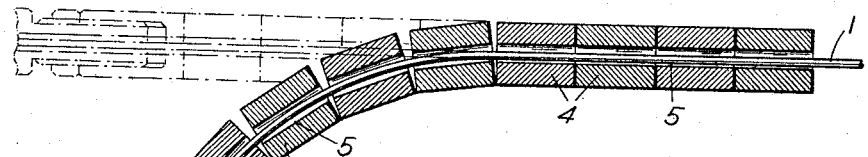
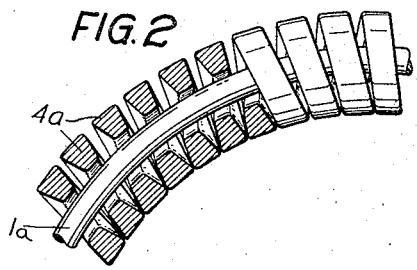
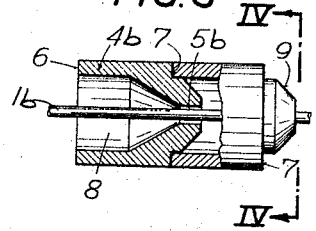 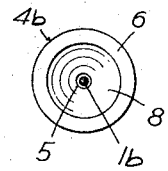 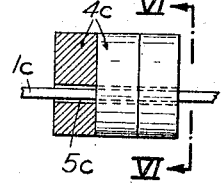 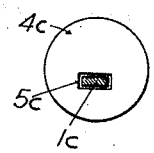
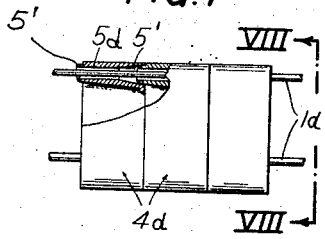 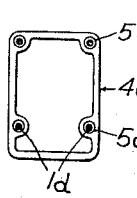 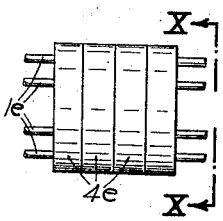 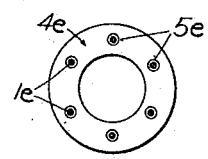
Wilhelm Schuster
INVENTOR.
BY
Karl F. Ross
Attorney Oct. 31, 1967
W. SCHUSTER
3,349,526
COLLAPSIBLE STRUCTURAL UNIT, REVERSIBLY RESILIENT IN
A PREDETERMINED DIRECTION AND RIGID IN
A SECOND PREDETERMINED DIRECTION
Filed May 20, 1965
5 Sheets-Sheet 2
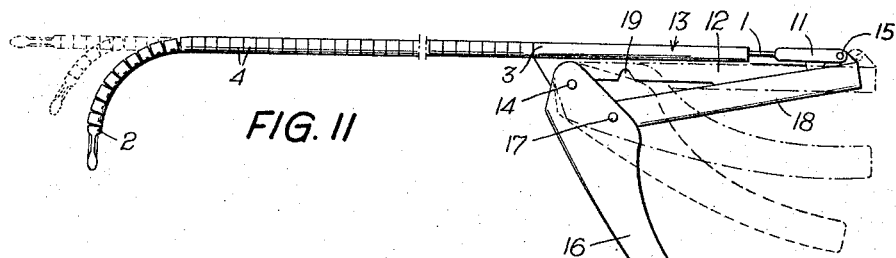
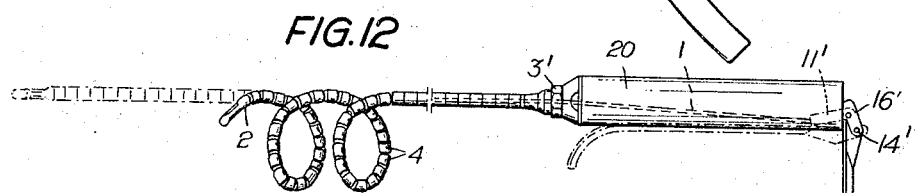
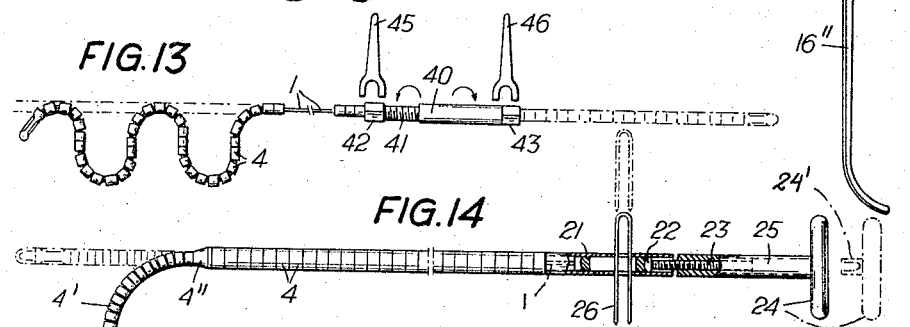
Wilhelm Schuster
INVENTOR.
BY
Karl F. Ross
Attorney Oct. 31, 1967 W. SCHUSTER 3,349,526
COLLAPSIBLE STRUCTURAL UNIT, REVERSIBLY RESILIENT IN
A PREDETERMINED DIRECTION AND RIGID IN
A SECOND PREDETERMINED DIRECTION
Filed May 20, 1965 5 Sheets-Sheet 3
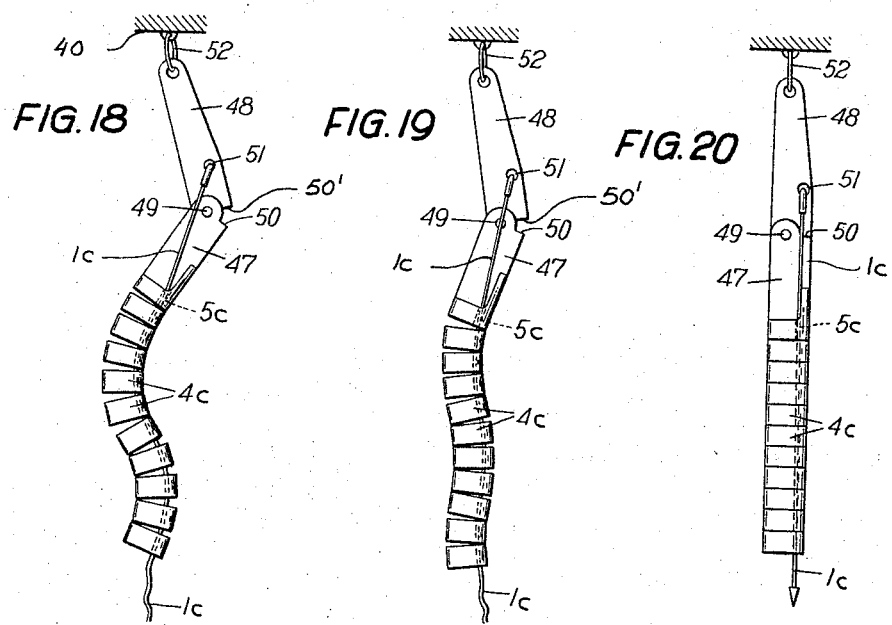
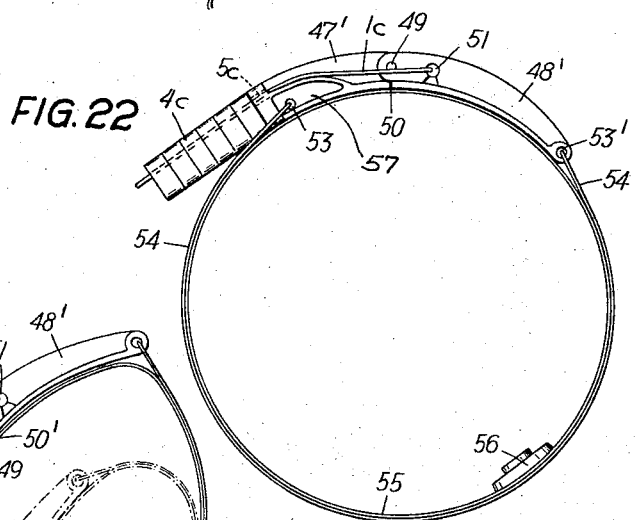
Wilhelm Schuster
INVENTOR.
BY
Karl F. Ross
Attorney

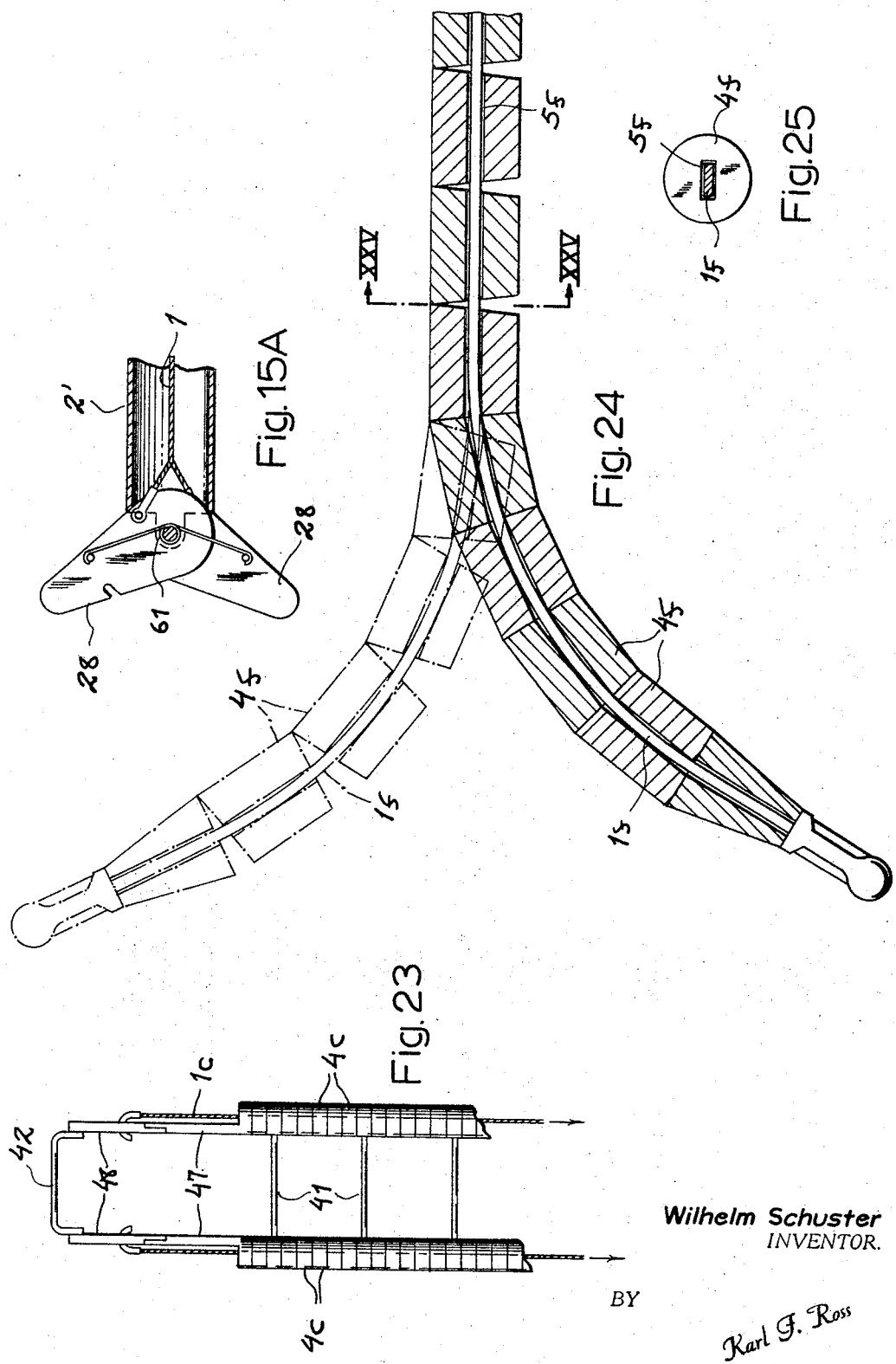

Oct. 31, 1967     W. SCHUSTER     3,349,526
COLLAPSIBLE STRUCTURAL UNIT, REVERSIBLY RESILIENT IN
A PREDETERMINED DIRECTION AND RIGID IN
A SECOND PREDETERMINED DIRECTION
Filed May 20, 1965     5 Sheets-Sheet 5
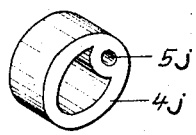
FIG. 28
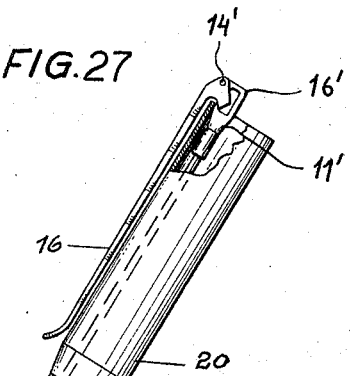
FIG. 27
FIG. 29
FIG. 30
FIG. 31
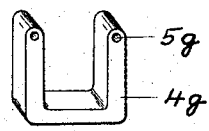
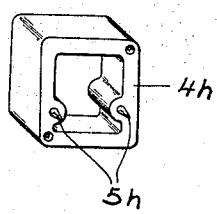
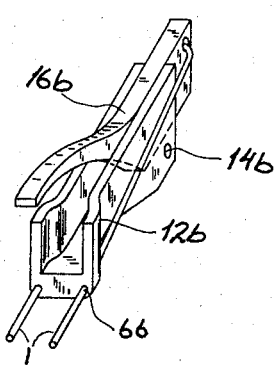
FIG. 26
Wilhelm Schuster
INVENTOR.
BY
Karl F. Ross
Attorney United States Patent Office 3,349,526
Patented Oct. 31, 1967

3,349,526
COLLAPSIBLE STRUCTURAL UNIT, REVERSIBLY RESILIENT IN A PREDETERMINED DIRECTION AND RIGID IN A SECOND PREDETERMINED DIRECTION
Wilhelm Schuster, Dauphinestrasse 194, Linz (Danube), Austria
Filed May 20, 1965, Ser. No. 457,363
Claims priority, application Austria, Dec. 4, 1959, A 8,802/59; May 20, 1964, A 4,402/64
15 Claims. (Cl. 52—108)

This application is a continuation-in-part of my copending application Ser. No. 72,837, filed Nov. 29, 1960 and now abandoned.

The present invention relates to a collapsible structure of the general type disclosed in my prior U.S. Patent No. 2,822,896, i.e. a device comprising an elongated body consisting at least in part of a plurality of contiguous body sections having perforations which, in an aligned position, form one or more longitudinal channels each traversed by an elogated, substantially inextensible but flexible tension element, such as a cord or a wire, which can be selectively stressed or unstressed for rigidifying the structure or relaxing it. Upon such relaxation, the body sections will separate so that the structure may be bent or rolled up for convenient storage or transportation.

In the system of my prior patent the perforations of the body sections are centrally disposed with reference to the longitudinal axis of the rigid structure, i.e. each section has only a single central bore or an array of several bores equispaced from the axis. Invariably, the pattern of longitudinal stresses due to the tensioning of the flexible element or elements has a resultant force along the axis, this being true even in those cases in which the body sections are bounded by end faces which are not exactly perpendicular to the individual axes of the body sections in order that the composite structure in its rigid condition may extend along a curved center line intsead of forming a straight body.

Upon the relaxation of the tension element or elements, a structure of this type is free to bend in any direction away from its straight or curved center line, in view of the symmetrical disposition of the passage or passages formed in each body section. This is not necessarily an advantage inasmuch as in various instances, e.g. on account of the presence of extensions or attachments, a single direction may be preferred for the bending of the relaxed structure. There are also situations in which it is desirable to have the structure curved in one direction when tensioned and in a certain other (e.g. opposite) direction when relaxed, as in the case of a stomach probe or other medical or surgical instrument designed to be flexed one way or another under manual control.

It is, therefore, the general object of my present invention to provide an improved collapsible structure of the type referred to which preferentially assumes, upon the release of its tensioning means, a predetermined position different from that which it occupies in its rigid state.

Another drawback of my earlier system is the fact that, owing again to the centered positioning of the tensioning means, the body sections must be free to move apart by a considerable distance when the structure is relaxed in order to permit a bending of the body with a reasonably small radius of curvature; this, in turn, requires that each tension cable or equivalent element be given sufficient slack in its unstressed condition to facilitate such separation, hence the operating mechanism must have a large stroke when moving from a stressing position to an unstressing position or vice versa. Moreover, such a major slackening of the cable or cables may be accompanied by a bunching of certain body sections so that they will no longer be uniformly distributed along the structure and it will be difficult to roll the body into a coil.

It is, therefore, another object of my instant invention to provide an arrangement which eliminates the disadvantages just described.

According to one aspect of my invention, a collapsible structure of the character set forth includes means for positively arraying the several body sections in a first direction, i.e. along a predetermined line, in a rigid condition of the structure and for preferentially deflecting these sections into a predetermined second direction in a relaxed condition.

The tension element or elements, forming part of the aforementioned means, may be biased by inherent resiliency toward positions deviating from those they assume in their tensioned state, this biasing force thus tending to deflect the structure in the aforesaid second direction during relaxation of the tension. Thus, the tension elements may in such case consist of spring wire or other material of suitable elasticity and may have a basic or "remembered" shape of simple, undulating, helical, spiral or composite curvature, depending upon the form which it is desired to impart to the relaxed structure. In cases where, by virtue of a beveling of the end faces of the body sections, the rigid structure has a certain curvature, the tension element may also be inherently straight.

It is, however, also possible, according to another specific feature of my invention, to replace the individual body sections of my prior patent by continguous turns of an elongated coil spring whose own resiliency provides the abovementioned biasing force. In this case a tension element extending within the turns of the spring can be stressed to straighten the latter whereas relaxation of this element causes the spring to follow a curved center line determined by the convolutions of the spring wire.

Another feature of my invention, utilized advantageously in conjunction with one or more resiliently biased tension elements, is the eccentric positioning of such element or elements so that the resultant tension force no longer coincides with the axis or center line of the rigidified structure but is distinctly offset to one side thereof, thereby enabling the relaxed structure to be bent with a smaller radius than would be possible with a given amount of slack in the case of a centered arrangement. This eccentric positioning of one or more tension elements is the subject of my above-identified application No. 72,837 and now abandoned.

A common characteristic of all the systems according to my invention is that, in the relaxed state, the body sections remain contiguous at least at one point, this contiguity being assured by the biasing force exerted by the tensioning means, by the offsetting of the tensioning means toward the periphery of the structure or by the fact that all these sections are part of a common helical member. Thus, there no longer is any danger of dislocation or bunching which would unduly hamper the handling of the collapsed structure.

The delicate adjustability of a device embodying my invention makes it particularly—though not exclusively —applicable to the medical field, not only for scopes and probes designed to explore the human or animal body but also for permanent or semipermanent appliances such as surgical or osteopathic nails and pins.

A variety of mechanisms are available for the control of the control of the tensioning means of my improved system. In the case of medical and surgical instruments, for example, manipulation by a hand lever or the like will generally be preferred in order that the operator may constantly adapt the configuraion of the instrument (e.g. a tube introduced in the nasopharyngeal region) to the shape of its surroundings. Automatic tensioning means, operated by fluid pressure or electromagnetic energy, may be used where greater stresses have to be exerted. In some instances, as in the case of a ladder or a tow bar, the stressing may also be effected by the weight of a person or by the inertia of an attached load.

The invention will be described in greater detail with reference to the appended drawing in which:

FIG. 1 is an axial sectional view of part of a collapsible structure embodying the invention, composed of discrete body sections;

FIG. 2 is a fragmentary view of a modified structure according to the invention, shows partly in elevation and partly in axial section with the body sections of FIG. 1 replaced by turns of a continuous coil spring;

FIG. 3 is an elevational view (parts broken away) of a body section of somewhat different shape adapted to be used with the structure of FIG. 1;

FIG. 4 is an end view of the body section taken on line IV—IV of FIG. 3;

FIG. 5 is a view similar to FIG. 3, showing still another type of body section;

FIG. 6 is an end view taken on the line VI—VI of FIG. 5;

FIG. 7 is a further view similar to FIGS. 3 and 5, illustrating still another type of body section;

FIG. 8 is an end view taken on the line VIII—VIII of FIG. 7;

FIG. 9 is a side-elevational view of a series of body sections with centered channels, of a type first disclosed in my prior U.S. patent;

FIG. 10 is an end view taken on line X—X of FIG. 9;

FIG. 11 is a side-elevational view of an entire structure emboding the invention, illustrated in different operating positions;

FIGS. 12–15 are views similar to FIG. 11, showing other structures embodying the invention;

FIG. 15A is an enlarged sectional detail view of the tip of the structure of FIG. 15;

FIG. 16 is an elevational view of a modified operating member for one of the structures shown in FIGS. 11–15;

FIG. 17 is a side-elevational view of a multiple structure according to the invention;

FIGS. 18–20 are elevational views of a further embodiment shown in three different positions;

FIG. 21 is a cross-sectional view of an inflatable operating member for a collapsible structure according to my invention;

FIG. 22 is a view similar to FIG. 21, showing the operating member in an inflated state;

FIG. 23 is a front-elevational view of a collapsible ladder generally similar to the structure of FIGS. 18–20;

FIG. 24 is a view similar to FIG. 1, showing a further modification;

FIG. 25 is a cross-sectional view taken on the line XXV—XXV of FIG. 24;

FIG. 26 is a perspective view of a modified operating member for a system according to my invention;

FIG. 27 shows still another collapsible body according to my invention;

FIG. 28 is a perspective view of one of the members of the body of FIG. 27; and

FIGS. 29–31 are perspective views similar to FIG. 28, showing other profiles of body sections for use in a structure according to my invention.

In FIG. 1 I have shown part of a collapsible structure according to my invention, comprising an elongated body adapted to be alternately relaxed (full lines) or rigidified (dot-dash lines) to assume either a bent or a straight shape. For this purpose the body, composed mainly of a plurality of tubular and substantially identical sections 4, is traversed by a tension cable 1 which extends through the aligned central bores 5 of the several sections 4 and is anchored at one end to the terminal member 2, its other end being secured to a suitable tightening device not shown in FIG. 1 but illustrated in subsequent figures. A member of adjustable length, consisting of a male part 2a and a female part 2b threadedly interconnected for relative rotation, is shown interposed between terminal member 2 and the last body section 4 so as to be traversed by the cable 1.

According to an important feature of my invention, the cable 1 consists of spring wire or other elastic material inherently so biased as to tend to deflect the structure into the full-line position of FIG. 1 when no tensioning force is applied to the cable at its right-hand end; in this slackened condition the cable, in assuming its curved natural shape, positively holds the body sections 4 in contact with one another along coplanar points of their confronting end faces. If this biasing force were absent, the slackened cable might flex in an irregular manner or even remain almost straight while the body sections 4 could shift along the cable, within the limits of the slack, so as to interfere with any attempt to bend the structure for the purpose of, say, winding it into a spiral or coil to facilitate storage. In this connection it may be mentioned that the inherent bias of cable 1 may be so great that, with sufficient slack, the structure will spontaneously wind itself into a circle or even a spiral; alternatively, e.g. as illustrated in FIGS. 12 and 13, the natural shape of the cable 1 may be helical or undulating so that the structure will have a similar configuration in its unstressed condition.

As the stress upon cable 1 increases, the structure will progressively straighten itself to approach the rectilinear position shown in dot-dash lines. It is thus possible, through selection of a suitable tensioning force, to immobilize the body 2, 2a, 2b, 4 in various positions with different radii of curvature, again with partial contiguity of the body members. By the same token, a variation of the applied stress can be utilized to move the body between its straight position and its position of maximum curvature, such mobility being important for example in the case of medical probes or scopes.

FIG. 2 shows part of a structure broadly similar to that of FIG. 1, comprising a tension cable 1a and a succession of body sections 4a which, however, do not constitute discrete members held together by the cable but are the turns of a continuous coil spring enveloping same. Again, as in the structure of FIG. 1, the body 1a, 4a is inherently biased into a curved position which it assumed when the element 1a is relaxed; upon the application of tension to this element, the spring composed of turns 4a tends to straighten itself out so as ultimately to attain a rectilinear shape. The biasing force in this case, however, is due to the inherent stress of the coil spring and therefore need not be supplied by the tension cable 1a which, accordingly, can be a simple flexible wire or cord of substantially inelastic material.

In FIGS. 3–10 I have illustrated several shapes which the body sections of FIG. 1, generally designated 4 in FIG. 1 and subsequent figures, may assume in special cases. FIGS. 3 and 4 show body sections 4b of generally cylindrical configuration, one annular end face 6 surrounding a central cavity 8 while the opposite annular end face 7 forms a shoulder around a boss 9 which defines a narrow passage 5b for the guidance of a cable 1b. The length of passage 5b is only a minor fraction of the overall length of the body section 4b, e.g. about one-fifth thereof, so as to afford greater relative mobility to the cable and the body sections.

FIGS. 5 and 6 show cylindrical, disk-shaped body sections 4c each formed with a throughgoing bore 5c of rectangular cross-section traversed by a tension element 1c of similar profile, i.e. a flat band of spring steel or the like having a substantially complementary rectangular cross-section. It will be noted that the passage 5c is laterally spaced from the center of the disk 4c so that element 1c extends parallel to but offset from the axis of the cylindrical body formed by these sections.

In FIGS. 7 and 8 I have shown body sections 4d of rectangular outline which are each formed with four passages 5d for the guidance of respective cables 1d, each passage 5d being widened at one end and extended at the other end by a boss 5' matingly fitting into the widened end of a corresponding passage on an adjoining body section so that all these sections are positively maintained in an aligned position. The length of the bosses 5' depends, of course, on the maximum separation of adjoining sections in the relaxed condition of the cables 1d. It will be noted that the passages 5d, and therefore the set of tension cables, form an eccentric array which, upon a substantially uniform tensioning of all the cables, gives rise to a resultant force offset from the longitudinal axis of the body, in a manner analogous to that of the single cable 1c of FIGS. 5 and 6.

In contradistinction to the arrangement of FIGS. 5–8, FIGS. 9 and 10 show a concentric arrangement of cables 1e which traverse multiple passages 5e in annular body sections 4e.

In FIG. 11 I have shown the entire assembly of a body structure according to my invention, except for some omitted body sections at the center of the structure. Thus, it will be seen that this structure includes a multiplicity of body sections 4, a terminal member 2 at one end and a terminal member 3 at the opposite end, the latter member having the shape of an elongated tube and being part of a tightening device 13 which includes an anchor member 11 secured to an extremity of cable 1, a handle 16 pivoted at 14 to a rib 12 rigid with tube 3, and a link 18 articulated at 15 to the member 11 and at 17 to the handle 16. Rib 12 is recessed at 19 to accommodate the pivot pin 17 when the handle 16 is moved into its cable-tightening position illustrated in dot-dash lines, thus straightening the structure. In an intermediate position of handle 16, shown in dashed lines, the structure 2, 4 assumes a shape intermediate that of its relaxed state (full lines) and that of its rigid position (dot-dash lines).

The terminal member 2, representing the free extremity of the structure, may be provided with a magnetic tip or equipped with other conventional means for gripping, electrifying, illuminating, cutting or otherwise treating an object, e.g. a part of the human organism or a piece of foreign matter to be extracted therefrom. The channel formed in the body of the structure by the perforations 5 (FIG. 1) or other passages may be used in such cases to accommodate electric wiring and/or mechanical means for operating the devices just mentioned to the extent that such operations cannot be performed by the tension element or elements themselves.

If the body 2, 4 of FIG. 11 were replaced by a helical spring of the type shown in FIG. 2, the structure would operate in essentially the same manner. This also applies to the various embodiments described hereinafter with reference to succeeding figures.

According to FIG. 12, the tension element 1 is inherently so biased as to tend to coil the structure into a helical shape in the relaxed condition illustrated in full lines, the alternate rectilinear position thereof again being shown in phantom lines. In this embodiment the cable 1 is anchored to a member 11' articulated at 16' to an operating lever or handle 16" which is pivotally mounted at 14' on a sleeve 20 adjoining the terminal member 3'. When used, for example, as a fishing rod, the structure of FIG. 12 is easily packed in a case or stowed away in a car while in its coiled position.

In FIG. 13 the tightening device is represented by a member of adjustable length composed of two matingly screw-threaded parts 40 and 41 respectively similar to parts 2b and 2a in FIG. 1, male part 41 having a square head 42 engageable by a wrench 45 while the female part 40 has a similar head 43 engageable by a wrench 46. With the aid of these wrenches (shown for the sake of clarity in face view) the parts 40 and 41 may be relatively rotated to increase or reduce the tension of cable 1. It will be noted that the tightening device of FIG. 13 is disposed at an intermediate location of the composite body rather than at one of its ends.

Another feature illustrated in FIG. 13 is the inherent biasing of cable 1 in such a way that the relaxed structure assumes an undulating shape. This feature, of course, is unrelated to the type of tightening device employed, any of the several devices disclosed herein being usable with any of the various body structures.

FIG. 14 illustrates still another structure according to my invention which differs from that of FIG. 11 by virtue of the fact that body sections 4 of relatively large diameter or width constitute the major part of the elongated body whereas other sections 4' of reduced width make up the end portion adjacent terminal member 2. A transition section 4" of tapering shape provides surface continuity between the two series of body sections 4 and 4'.

FIG. 14 also shows still another tightening device comprising a sleeve 21 in which a bar 22 is axially slidable, this bar being anchored to the tension cable 1 at one end. The opposite (i.e. right-hand) end of bar 22 has an extension 23 formed with male threads engaged by an internally threaded tube 25. The outer end of tube 25 is shaped to receive a pronged boss 24' of a handwheel 24 which is thus detachably engageable with tube 25 for positively rotating same in one sense or the other to tighten or to release the structure. In order to prevent rotary entrainment of the bolt 23 by its nut 25, the bar 22 is longitudinally slotted and traversed by a key 26 passing through opposite peripheral slots of tube 21, key 26 being removable along with handwheel 24 so as to leave only a unitary, slender structure adapted to be used, for example, as an osteopathic nail. Withdrawal of the key 26 insures that there should be no spontaneous relaxation of tension in cable 1, the removal of handwheel 24 also preventing accidental movement of the nail and facilitating the application of a plaster cast around the structure.

FIG. 15 shows another structure generally similar to that of FIG. 11, the terminal member 2 being here replaced by a tubular member 2' having a pair of wings 28 pivotally connected to it by a pin 60 and engaged by a split end of tension cable 1; see also FIG. 15A. A spring 61 tends to maintain the wings 28 in a registering position of alignment with member 2', as shown in full lines in FIG. 15, yet the tensioning of cable 1 spreads them apart into a laterally projecting position in which they prevent the withdrawal of body 2', 4 from an object penetrated thereby. Thus, spring 61 could be made so stiff that the body is straightened before the wings 28 are spread apart, thereby permitting such penetration, whereupon a further tightening of cable 1 deflects the wings so that they act as detents.

FIG. 15 further illustrates a hydraulic or pneumatic tightening device in which fluid under pressure is admitted at 62 into a cylinder 27 to act upon a piston 63 anchored to cable 1, the cylinder 27 being vented at 64.

As shown in FIG. 16, a lever 16a rigid with a pinion 30 may operate a terminal member 3a in a tubular guide 12a with the aid of rack teeth 29 on sleeve 3a engaged by the pinion 30; a ratchet 64, also rigid with lever 16a, is releasably engaged by a pawl 65 adapted to arrest the lever in any of several positions corresponding to different degrees of tension applied to cable 1.

FIG. 17 shows a multiple structure with four bodies 35, 36, 37, 38, each composed of a terminal member 2 and a multiplicity of sections 4, projecting in various directions from a common distributor head 32 having a stem 31 of a construction similar to that of arms 35–38, i.e. with sections 4x traversed by a tension cable 1. A link 39 connects the central cable 1 with four satellite cables 34, one for each arm, which pass over deflecting rollers 33 and are jointly tensionable by a tightening device (not shown) connected to the free end of cable 1. Naturally, the link 39 could also be positioned closer to the tightening device, with cables 34 passing through all or part of the stem 31, or could be omitted entirely (along with cable 1) with direct connection of each element 34 to the tightening device.

The arms 35–38 could be interconnected by a flexible sheet, now shown, and, depending upon their positioning in a common plane or in a radial array, could thus be used as a frame for a collapsible wall, fan, umbrella or the like.

In FIGS. 18–20 I have shown part of a structure comprising an elongated body composed mainly of eccentrically perforated sections 4c as illustrated in FIGS. 5 and 6. An inner terminal member 47 and an outer terminal member 48 are hingedly interconnected at 49 and are respectively formed with abutments 50, 50' on one side of the hinge, i.e. on the side of the structure closest to the eccentric passages 5c forming the channel for element 1c. The latter is anchored at 51 to the outer terminal member 48 which in turn is attached to a support 40 by a loop 52. As will be seen from FIG. 20, the point of attachment 51 is offset from the axis of the rigid structure on the same side as the passages 5c so that the cable 1c extends between the abutments 50, 50' and the pivot 49, having moved through a dead-center position (FIG. 19) as the structure approaches its rectilinear shape so as to act as a toggle mechanism. The opposite end of the structure, not shown, may comprise a symmetrical pair of hinged terminal members so that the device may be attached between two objects exerting a tensile stress thereon, e.g. by being connected as a tow bar between a tractor and a trailer. In this case the pull of the tractor will stiffen the body 1c, 4c into a substantially rigid link between the two vehicles.

FIGS. 21 and 22 illustrate another tightening device adapted to be used for a structure of the type shown in FIGS. 18–20, i.e. one which terminates in a pair of hinged members here designated 47' and 48'; the remaining reference characters are the same as in the preceding figure. Members 47' and 48' are shown secured to a flexible strap 54 which embraces an inflatable bag 55 provided with an inlet 56 for air or some other pressure fluid. One end of the strap 54 is attached at 53 to an extension 57 of the last body section which has a curved guide surface for the cable 1c; the other end of strap 54 is attached at 53' to the outer end of terminal 48'. In the deflated condition of bag 54, illustrated in dot-dash lines in FIG. 21, the body 1c, 4c is collapsed, as in FIG. 18; in the partly inflated condition shown in full lines in FIG. 21, the body has a more nearly rectilinear shape, as shown in FIG. 19; and in the fully inflated condition (FIG. 22) the body is straight as in FIG. 20. The bag may be inflated, for example, by mouth or with the aid of a cartridge.

The inflatable bag 55 of FIGS. 21 and 22 may also serve as a float in the event that the structure is used on water, e.g. as part of a collapsible life raft.

The structure of FIGS. 18–20 is also representative of a collapsible ladder, shown in front view in FIG. 23. It will be noted that this ladder consists of two stringers, each having a structure identical with that of the tow bar shown in FIGS. 18–20, and a series of rungs 41 interconnecting certain of the body sections 4c of the two stringers. The two end members 48 of the two stringers are shown interconnected by a bail 42. The bottom of the ladder may hang free so that the weight of a person stepping onto the lowest rung will stiffen it.

FIG. 24 shows a composite body which differs from that of FIG. 1 mainly by the fact that its constituent sections 4f are of trapezoidal profile in the plane of inherent curvature as brought about under the influence of the inherent bias of resilinet cable 1f (dot-dash line). When the cable 1f is relaxed, this bias will curve the body upwardly (as viewed in FIG. 24) which the sections 4f contacting one another only along the ends of the major bases of their profiles. When, however, the cable is tightened, the beveled end faces of the body sections will lie flat against one another so that the structure will assume the downwardly curved position illustrated in full lines. A rectilinear position, not illustrated, can be obtained by a partial tensioning of the cable.

As illustrated in FIG. 25, each of the sections 4f is similar to section 4c (see FIG. 6) except for the fact that its rectangular bore 5f is shown to be centrally positioned. Naturally, an eccentric arrangement as illustrated in FIGS. 5 and 6 or 7 and 8 may be used with the structure of FIG. 24 or with those of any of FIGS. 11–17, for the purpose of affording a smaller radius of curvature, as is also true of the devices illustrated in FIGS. 18–23.

FIG. 26 shows a tightening device comprising a bracket 12b having a lever 16b pivotally mounted thereon at 4b. Two cables 1 are anchored to the lever 16b and pass through channels 66 along respective edges of the U-shaped bracket. Such a tightening device is advantageously used with body sections 4g, FIG. 30, or 4h, FIG. 31, having a pair of channels 5g or 5h eccentrically disposed with reference to the U-shaped or rectangular body profiled. Another body section adapted to be used in connection with the tightening of FIG. 26 is shown at 4i in FIG. 29 and has an I-shaped profile, the channels 5i being arranged in one flange of the I.

FIG. 27 shows a structure whose elongated body is composed of annular sections 4j illustrated separately in FIG. 28. Each of these sections has a single passage 5j eccentrically located next to the outer periphery of the section. The sections 4j, of relatively large diameter, constitute the major part of the body which also has a terminal portion composed of similar sections 4j' of smaller diameter, the latter being traversed by the cable 1 at a location which has the same distance from the outer periphery of the sections as in the larger sections 4j. Tapering transition sections 4j'', also formed with bores which are aligned with the passages 5j of sections 4j, provide surface continuity between sections 4j and 4j'. The channel constituted by the passages 5j in sections 4j and by corresponding passages in sections 4j'' and 4j' may traverse the latter sections substantially centrally, as shown, or eccentrically as is true of the other sections. In any event, the distance of of the channel-forming passages from the periphery of the respective body sections will be constant throughout the structure and independent of the diameters of these sections whereby the tension element 1 lies substantially parallel to the surface of the body, along a line which represents the closest approach of that surface to element 1.

As in the embodiment previously described, tension element 1 is anchored at one end to a terminal member, here designated 2j, and at the other end to a tightening device which as shown is generally similar to that of the structure of FIG. 12, comprising a sleeve 20 and a handle 16'' pivoted at 14' to an extension 16' of an anchor member 11'.

The arrangements shown in FIGS. 26–31 have also been disclosed in my aforementioned copending application Ser. No. 72,837. In accordance with my present improvement, however, the tensionable element 1 in FIG. 27 may be of the same resilient character as the elements previously described with reference to FIGS. 1 and 3 to 25, thus tending to deflect the composite body into a curved position (e.g. as shown in dot-dash lines) in the direction of the offset of the cable 1 from the center line of that part of the structure which includes the body sections 4j.

Again, tightening devices other than the one shown in FIG. 27, e.g. as illustrated in preceding figures, may be used in conjunction with this embodiment, it being apparent that features disclosed in different embodiments may be interchanged within the limits of compatibility without departing from the spirit and scope of my invention except as defined in the appended claims.

I claim:
1. A collapsible structure comprising an elongated body consisting at least in part of a plurality of consecutive body sections disposed in pressure-transmitting relationship and in substantial alignment in a rigid condition of said body along a predetermined line, each of said sections being bounded by a pair of contact surfaces extending substantially transversely to said line in said rigid condition, each of said sections being formed with at least one passage extending generally in the direction of said line and registering with corresponding passages of adjoining sections for defining therewith at least one throughgoing channel; means including an elongated resilient tension element extending through said channel for positively arraying said sections in a first direction along said line in said rigid condition and for elastically deflecting said sections into a predetermined second direction in a relaxed condition; and releasable tightening means connected with said element for selectively stressing and unstressing same with reference to said sections whereby the latter are respectively placed in said rigid and said relaxed condition, said tension element being of resilient character with an inherent bias tending to deflect said element away from said predetermined line in said second direction.

2. A structure as defined in claim 1 wherein said body sections are of generally trapezoidal outline in a common plane for curving said body in said plane upon a tightening of said tension element, said bias being effective in said plane in a direction away from the center of curvature.

3. A structure as defined in claim 2 wherein said passages and said tension element are of mating noncircular cross-section for maintaining said body sections and said element in an invariable relative angular position.

4. A structure as defined in claim 1 wherein said tightening means comprises a manually operable handle at one end of said structure.

5. A structure as defined in claim 4 wherein said tightening means further includes gear means positively connecting said handle with said tension element.

6. A structure as defined in claim 5, further comprising releasable indexing means coupled with said gear means for arresting said handle in at least one intermediate position.

7. A structure as defined in claim 1, further comprising latch means for temporarily locking said tightening means in a position of at least partial stress of said tension element.

8. A structure as defined in claim 1 wherein said tightening means comprises a displaceable member responsive to fluid pressure.

9. A structure as defined in claim 8 wherein said displaceable member is an inflatable membrane.

10. A structure as defined in claim 1 wherein said body is provided at one of its ends with at least one swingable terminal member anchored to said element for swinging laterally outwardly upon a tensioning of said element, thereby preventing withdrawal of said body from an object penetrated by it, said tightening means being located at the opposite end of said body.

11. A structure as defined in claim 1 wherein said tightening means comprises a sleeve abutting said body, a threaded male member slidable in said sleeve and anchored to said element, a complementarily threaded female member engaging an extremity of said male member projecting from said sleeve, detachable actuating means for rotating said female member, and removable key means for holding said male member against rotation with reference to said sleeve whereby said body is secured against release upon removal of said key means and operating means in said rigid condition.

12. A collapsible structure comprising an elongated body consisting at least in part of a plurality of continuous body sections disposed in pressure-transmitting relationship and in substantial alignment in a rigid condition of said body along a predetermined center line, each of said sections being bounded by a pair of contact surfaces extending substantially transversely to said center line in said rigid condition, each of said sections being formed with at least one passage extending generally in the direction of said center line and registering with corresponding passages of adjoining sections for defining therewith at least one throughgoing channel; elongated resilient tensioning means extending through said passages from one end of said body to the other for positively arraying said sections along said center line in said rigid condition and for elastically deflecting said sections in a relaxed condition into a predetermined alternate position in which said sections are in partial contact with one another at locations offset from said center line; and releasable tightening means connected with said element for selectively stressing and unstressing same with reference to said sections whereby the latter are respectively placed in said rigid and said relaxed condition.

13. A collapsible structure comprising an elongated body consisting at least in part of a plurality of contiguous body sections disposed in pressure-transmitting relationship and in substantial alignment in a rigid condition of said body along a predetermined center line, each of said sections being bounded by a pair of contact surfaces extending substantially transversely to said center line in said rigid condition, each of said sections being formed with at least one passage extending generally in the direction of said center line and registering with corresponding passages of adjoining sections for defining therewith at least one throughgoing channel; elongated elastic tensioning means extending through said passages from one end of said body to the other in eccentric relationship with said center line for positively arraying said sections along said center line in said rigid condition with exertion of a resultant longitudinal stress offset from said center line and for facilitating deflection of said sections in the direction of the offset in a relaxed condition, said tensioning means being biased by the inherent resiliency thereof in the direction of the offset; and releasable tightening means connected with said element for selectively stressing and unstressing same with refernce to said sections whereby the latter are respectively placed in said rigid and said relaxed condition.

14. A structure as defined in claim 13 wherein said tightening means comprises an inner and an outer terminal member hingedly interconnected at one end of said body, said members being provided on the side of said offset with respective abutments contacting each other in a positioning of alignment of said members with said body sections, said tension element being anchored to said outer terminal member and extending in said rigid condition between said abutments and the hinge axis of said terminal members.

15. A collapsible structure comprising an elongated body consisting at least in part of a plurality of contiguous body sections disposed in pressure-transmitting relationship and in substantial alignment in a rigid condition of said body along a predetermined center line, each of said sections being bounded by a pair of contact surfaces extending substantially transversely to said center line in said rigid condition, each of said sections being formed with a single passage extending generally in the direction of said center line but laterally spaced therefrom and registering with corresponding passages of adjoining sections for defining therewith a throughgoing channel offset from said center line; a single elongated elastic tensioning element extending through said channel from one end of said body to the other for positively arraying said sections along said center line in said rigid condition with exertion of a resultant longitudinal stress offset from said center line and for facilitating deflection of said sections in the direction of the offset in a relaxed condition, said element being biased by its inherent resiliency in the direction of the offset; and releasable tightening means connected with said element for selectively stressing and unstressing same with reference to said sections whereby the latter are respectively placed in said rigid and said relaxed condition.

References Cited

UNITED STATES PATENTS

| | | | |
|---|---|---|---|
| 423,548 | 3/1890 | Boyer | 212—138 |
| 646,458 | 4/1900 | Pedrick | 212—138 |
| 1,934,900 | 1/1933 | Wills | 52—160 |
| 2,366,997 | 1/1945 | Brand | 52—160 |
| 2,421,279 | 5/1947 | Marty | 46—126 |
| 2,524,748 | 10/1950 | Baker | 52—108 X |
| 2,822,896 | 2/1958 | Schuster | 52—108 |
| 2,833,249 | 5/1958 | Cornman | 46—126 X |
| 2,902,789 | 9/1959 | Mehr | 43—18 |

FOREIGN PATENTS

| | | |
|---|---|---|
| 448,048 | 4/1948 | Canada. |
| 531,975 | 8/1955 | Italy. |

FRANK L. ABBOTT, *Primary Examiner.*

RICHARD W. COOKE, JR., *Examiner.*

ROBERT S. VERMUT, *Assistant Examiner.*